United States Patent
Moorkanikkara et al.

(10) Patent No.: US 9,919,237 B2
(45) Date of Patent: Mar. 20, 2018

(54) DECREASING MALDISTRIBUTION IN SEPARATION TOWERS

(71) Applicants: Srinivas N. Moorkanikkara, Pittsburgh, PA (US); Edward J. Grave, Spring, TX (US); John T. Cullinane, Easton, PA (US)

(72) Inventors: Srinivas N. Moorkanikkara, Pittsburgh, PA (US); Edward J. Grave, Spring, TX (US); John T. Cullinane, Easton, PA (US)

(73) Assignee: ExxonMobil Upstream Research Company, Spring, TX (US)

( * ) Notice: Subject to any disclaimer, the term of this patent is extended or adjusted under 35 U.S.C. 154(b) by 259 days.

(21) Appl. No.: 14/426,018

(22) PCT Filed: Sep. 30, 2013

(86) PCT No.: PCT/US2013/062700
§ 371 (c)(1),
(2) Date: Mar. 4, 2015

(87) PCT Pub. No.: WO2014/070352
PCT Pub. Date: May 8, 2014

(65) Prior Publication Data
US 2015/0231526 A1  Aug. 20, 2015

Related U.S. Application Data

(60) Provisional application No. 61/722,684, filed on Nov. 5, 2012.

(51) Int. Cl.
  *B01D 47/00* (2006.01)
  *B01D 53/14* (2006.01)
  *B01D 3/14* (2006.01)
  *B01F 3/04* (2006.01)

(52) U.S. Cl.
  CPC ............ *B01D 3/14* (2013.01); *B01F 3/04439* (2013.01); *B01F 3/04496* (2013.01)

(58) Field of Classification Search
  None
  See application file for complete search history.

(56) References Cited

U.S. PATENT DOCUMENTS

| | | | |
|---|---|---|---|
| 2,375,336 A | 5/1945 | Weitkamp | 261/95 |
| 5,262,094 A | 11/1993 | Chuang et al. | 261/97 |
| 5,407,605 A | 4/1995 | Resetarits et al. | 261/98 |
| 5,451,349 A | 9/1995 | Kingsley | 261/91 |
| 5,752,538 A | 5/1998 | Billingham et al. | 137/1 |
| 5,984,282 A | 11/1999 | Armstrong et al. | 261/112.2 |
| 6,045,762 A | 4/2000 | Chuang et al. | 422/195 |

(Continued)

FOREIGN PATENT DOCUMENTS

GB  1013777  12/1965  ............ B01D 3/28

*Primary Examiner* — Amber R Orlando
*Assistant Examiner* — Phillip Y Shao
(74) *Attorney, Agent, or Firm* — ExxonMobil Upstream Research Company Law Department

(57) ABSTRACT

Systems and methods are provided for reducing maldistribution of liquids and vapors in packed towers. An exemplary separation system includes a separation tower including at least two packed beds, and a vapor redistribution plate disposed between two sequentially disposed packed beds, wherein the vapor redistribution plate is configured to mix a vapor from a lower packed bed before introducing the vapor into an upper packed bed.

19 Claims, 14 Drawing Sheets

(56) References Cited

U.S. PATENT DOCUMENTS

| | | | |
|---|---|---|---|
| 6,086,055 A | 7/2000 | Armstrong et al. | 261/96 |
| 6,149,136 A | 11/2000 | Armstrong et al. | 261/19 |
| 6,397,630 B1 | 6/2002 | Fraysse et al. | 62/643 |
| 2003/0047438 A1 | 3/2003 | Tamura et al. | 203/2 |
| 2004/0020238 A1 | 2/2004 | Kalbassi et al. | 62/617 |
| 2008/0271983 A1 | 11/2008 | Alzner et al. | 202/158 |
| 2010/0276821 A1 | 11/2010 | Lee et al. | 261/79.1 |

100

700

900

1300

DECREASING MALDISTRIBUTION IN SEPARATION TOWERS

CROSS-REFERENCE TO RELATED APPLICATION

This application is the National Stage of International Application No. PCT/US2013/062700, filed Sep. 30, 2013, which claims the benefit of U.S. Provisional Patent Application 61/722,684 filed Nov. 5, 2012 entitled DECREASING MALDISTRIBUTION IN SEPARATION TOWERS, the entirety of which is incorporated by reference herein.

FIELD OF THE INVENTION

The present techniques provide for the contacting of a gas stream with a liquid stream. More specifically, the present techniques provide decreasing maldistribution in separation towers.

BACKGROUND

This section is intended to introduce various aspects of the art, which may be associated with exemplary embodiments of the present techniques. This discussion is believed to assist in providing a framework to facilitate a better understanding of particular aspects of the present techniques. Accordingly, it should be understood that this section should be read in this light, and not necessarily as admissions of prior art.

The production of hydrocarbons from a reservoir oftentimes carries with it the incidental production of non-hydrocarbon gases and other materials. Such materials include acid contaminants such as hydrogen sulfide ($H_2S$) and carbon dioxide ($CO_2$), hydrocarbons having molecular weights outside of a target range, and other materials. For example, when $H_2S$ or $CO_2$ are produced as part of a hydrocarbon gas stream, such as methane or ethane, the raw gas stream is sometimes referred to as "sour gas." The $H_2S$ and $CO_2$ are often referred to together as "acid gases."

Processes have been devised to remove contaminants and other materials from a raw hydrocarbon streams. Such processes include distillation or absorption, for example, by a physical solvent or a chemically reactive species. All of these processes use a separation tower to remove target impurities, such as a contaminate gas, from a target material, such as a produced hydrocarbon.

For example, a separation tower may be used as a distillation column to separate materials by boiling point differences. In distillation, vapor flows from the bottom of the tower to the top of the tower, while liquid flows from the top of the tower to the bottom. As a result, the lower boiling point materials are concentrated in the top of the tower, while higher boiling point materials are concentrated in the bottom of the tower. A vapor is typically produced by a reboiler heating mixed liquids at the bottom of the tower. A portion of vapors flowing from the top of the tower are condensed and returned to the tower as a reflux flow.

In an absorption column, a solvent is contacted with a gas in a counter current flow, with the liquid solvent dropping through the rising gas. The products are a gas that has a substantially decreased concentration of a target material, and a liquid stream that has a substantially increased concentration of the target material.

Both absorption and distillation rely on mass transfer, which is accomplished by intimate contact between the vapor and liquid phases. In these processes, a tower containing a number of packed beds is often used to provide enhanced contact between the vapor and liquid phase over the simple dropping of the liquid phase through the vapor phase as droplets. Liquid distributors are placed over each packed bed to evenly distribute the liquid onto the bed, while allowing vapors to flow upward into a higher packed bed.

Conventional distributors rely on gravity flow from open troughs filled with the liquid. The troughs have metering orifices on the side walls or the bottom, meaning that liquid head above these orifices determines the flow rate. The liquid from each orifice typically discharges into small tube, or flow guide, which directs the stream of liquid to a discrete distribution point. Maintaining uniform flow from all of the distribution points is dependent on the type and design of the distributor and the ability to maintain a level orientation. These distributors are typically designed with a relatively low liquid head, e.g., about five to about eight centimeters, above the final metering element.

However, maldistribution of the liquid and vapor phases can occur. For example, maldistributions can be caused by fouling of the packing or a liquid distributor, mechanical failure, or operation under tilted or moving conditions. For example, in floating service, these distributors may provide uneven distribution to the top of the packing due to tilting and motion during operation, which can cause sloshing and splashing of the liquid inside the distributor. The maldistribution can result in substantial reductions in efficiency.

There have been alternatives suggested for use in services that are more prone to maldistribution. One approach uses a multiple spray nozzle apparatus over the cross-section of the tower. However, liquid distribution quality from spray nozzles may be poor since the spray patterns must overlap to achieve full coverage and fine droplets are often generated, which can be entrained with the vapor phase. Furthermore, spray nozzles rely on high pressure drop, e.g. >100 kPa, requiring external pumps for boosting liquid pressure. Also, spray nozzles have limited turndown and are prone to fouling.

Another alternative is a tube, or pipe, distributor. These distributors are comprised of a central pipe fed by a pressurized liquid line or an elevated reservoir of liquid. The central pipe is connected to multiple lateral pipes. Each lateral pipe has a plurality of orifices located on the bottom of the pipe for metering fluid discharge as a distribution point. These distributors can have several disadvantages. They are susceptible to fouling. Further, the lack of flow guides creates some uncertainty regarding location of liquid distribution to the top of the packing. The high liquid head may produce a liquid stream that can jet into the packing, which may lead to excessive foaming, splashing, and increased entrainment. Finally, high liquid velocities in the lateral pipes may trap vapor upon filling, since the bottom orientation of the metering orifice does not provide a vapor outlet. This may result in periods of uneven distribution if the vapor pocket occupies too much of the pipe cross-section.

One example of these types of systems is described in U.S. Pat. No. 6,149,136, which discloses a distributor for a packed liquid-vapor contact column. The liquid distributor includes a header tank, a liquid distribution plate having vapor riser passages, and a multiplicity of discrete reservoir cells each having an aperture to allow the flow of liquid into the column. Conduits are positioned for feeding liquid from the header tank into each cell. The liquid distribution plate has a uniform cross-cross structure with alternating vapor riser passages and reservoir cells of identical shape and size. The conduits may have two or more sections each feeding a discrete group of reservoir cells from a location of the header tank at an elevation spaced from that of the other sections. The distributor compensates for column sway or tilt when mounted on, for example, a ship.

U.S. Pat. No. 5,752,538 describes a liquid distributor for packed columns. The liquid distributor includes a baffle which extends over the cross section of a liquid-vapor contacting column and is suspended above a distributor floor. The baffle, having an open space, converges and mixes liquid flow falling from a liquid-vapor contacting zone above, before dispersing it to the distributor below. The open space of the baffle may also be fitted with a mixing device for further enhancement of liquid mixing.

U.S. Pat. No. 6,397,630 describes a floating marine structure. The floating structure has an oscillation angle (i) of not more than about 10 degrees, and bears an air distilling column with corrugated criss-cross packing. The undulating configuration of the corrugated strips of at least one pack is selected such that d/i<6, where d is the axis deviation of the cone spreading the liquid, when each pair of adjacent strips of the pack is inclined at an angle i in its general plane.

However, these techniques may not fully compensate for the loss of efficiency from maldistribution of liquids in a tilted or moving separation tower on a seagoing platform, such as a floating production, storage, and offloading (FPSO) platform. Further, none of these systems compensates for maldistribution of vapors in a separation tower.

SUMMARY

An embodiment described herein provides a separation system that includes a separation tower including at least two packed beds, and a vapor redistribution plate disposed between two sequentially disposed packed beds, wherein the vapor redistribution plate is configured to mix a vapor from a lower packed bed before introducing the vapor into an upper packed bed.

Another embodiment provides a sea going vessel that includes a separation tower including at least two packed beds, and a vapor redistribution plate disposed between two sequentially disposed packed beds. The vapor redistribution plate is configured to mix a vapor from a lower packed bed before introducing the vapor into an upper packed bed.

Another embodiment provides a method for decreasing maldistribution of materials in a separation tower. The method includes mixing vapor rising from a top of a first packed bed before introducing the vapor to a bottom of a second packed bed.

BRIEF DESCRIPTION OF THE DRAWINGS

The advantages of the present techniques are better understood by referring to the following detailed description and the attached drawings, in which.

DETAILED DESCRIPTION

Figure 1:
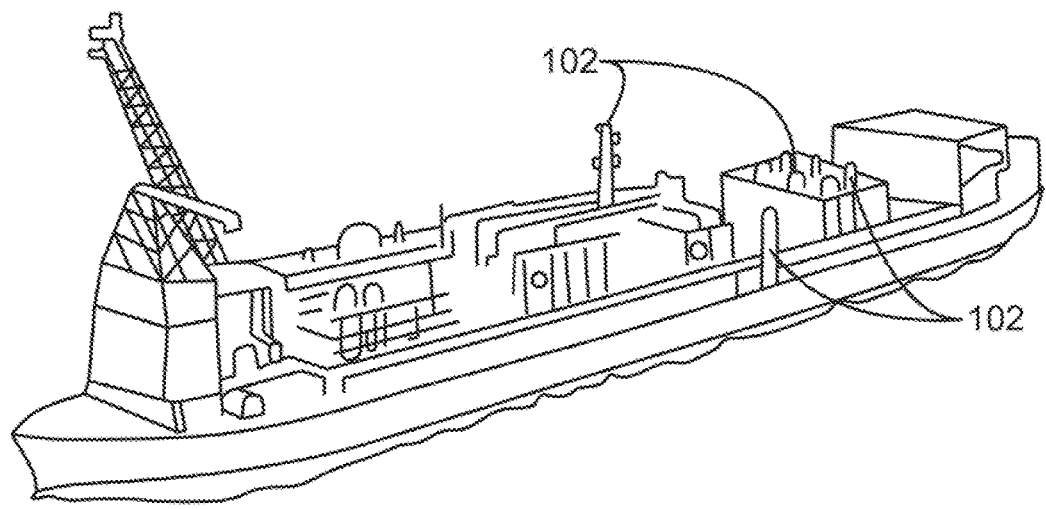
FIG. 1 is a drawing of a floating processing and storage vessel (FPSO) that uses separation towers.

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the techniques are not limited to the specific embodiments described below, but rather, include all alternatives, modifications, and equivalents falling within the true spirit and scope of the appended claims.

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

"Acid gas" refers to any gas that dissolves in or reacts with water to produce an acidic solution. Non-limiting examples of acid gases include hydrogen sulfide ($H_2S$), carbon dioxide ($CO_2$), sulfur dioxide ($SO_2$), carbon disulfide ($CS_2$), carbonyl sulfide (COS), mercaptans, or mixtures thereof.

As used herein, a "separation tower" is an elongated, cylindrical vessel, disposed in a vertical configuration, in which a counter current flow is used to isolate materials on the basis of differing properties. In an separation tower based on absorbance, a physical solvent is injected into the top, while a mixture of gases to be separated is flowed through the bottom. As the gases flow upwards through the falling stream of absorbent, one gas species is preferentially absorbed, lowering its concentration in the vapor stream exiting the top of the column.

The term "distillation," or "fractionation," refers to the process of physically separating chemical components into a vapor phase and a liquid phase based on differences in the components' boiling points and vapor pressures at specified temperatures and pressures. Distillation is typically performed in a type of separation tower often term a "distillation tower," which includes a series of vertically spaced plates. A feed stream enters the distillation column at a mid-point, dividing the distillation column into two sections.

The top section may be referred to as the rectification section, and the bottom section may be referred to as the stripping section. Condensation and vaporization occur in packed beds or other structures, causing lower boiling point components to rise to the top of the distillation column and higher boiling point components to fall to the bottom. A re-boiler is located at the base of the distillation column to add thermal energy. The "bottoms" product is removed from the base of the distillation column. A condenser is located at the top of the distillation column to condense the product emanating from the top of the distillation column, which is called the distillate. A reflux pump is used to maintain flow in the rectification section of the distillation column by pumping a portion of the distillate back into the distillation column.

As used herein, the term "fluid" refers to gases, liquids, and combinations of thereof.

The term "gas" is used interchangeably with "vapor," and is defined as a substance or mixture of substances in the gaseous state as distinguished from the liquid or solid state. Likewise, the term "liquid" means a substance or mixture of substances in the liquid state as distinguished from the gas or solid state.

A "hydrocarbon" is an organic compound that primarily includes the elements hydrogen and carbon, although nitrogen, sulfur, oxygen, metals, or any number of other elements may be present in small amounts. As used herein, hydrocarbons generally refer to components found in natural gas, oil, or chemical processing facilities.

"Liquefied natural gas" or "LNG" is a cryogenically liquefied natural gas that usually contains a high percentage of methane. LNG may also include trace amounts of other compounds. The other elements or compounds may include, but are not limited to, ethane, propane, butane, carbon dioxide, nitrogen, helium, hydrogen sulfide, or combinations thereof. LNG is formed by processing natural gas, for example, in separation towers, to remove various components such as helium, water, acid gases, or heavy hydrocarbons. The processed natural gas is then condensed into a cryogenic liquid at almost atmospheric pressure by cooling.

The term "liquid solvent" refers to a fluid in substantially liquid phase that preferentially absorbs one component over another. For example, a liquid solvent may preferentially absorb an acid gas, thereby removing or "scrubbing" at least a portion of the acid gas component from a gas stream or a water stream.

"Natural gas" refers to a multi-component gas obtained from a crude oil well or from a subterranean gas-bearing formation. The composition and pressure of natural gas can vary significantly. A typical natural gas stream contains methane ($CH_4$) as a major component, i.e., greater than 50 mol % of the natural gas stream is methane. The natural gas stream can also contain ethane ($C_2H_6$), higher molecular weight hydrocarbons (e.g., $C_3$-$C_{20}$ hydrocarbons), one or more acid gases (e.g., carbon dioxide or hydrogen sulfide), or any combinations thereof. The natural gas can also contain minor amounts of contaminants such as water, nitrogen, iron sulfide, wax, crude oil, or any combinations thereof. The natural gas stream may be substantially purified prior to use in embodiments, so as to remove compounds that may act as poisons.

"Solvent" refers to a substance capable at least in part of dissolving or dispersing one or more other substances, such as to provide or form a solution. The solvent may be polar, nonpolar, neutral, protic, aprotic, or the like. The solvent may include any suitable element, molecule, or compound, such as methanol, ethanol, propanol, glycols, ethers, ketones, other alcohols, amines, salt solutions, or the like. The solvent may include physical solvents, chemical solvents, or the like. The solvent may operate by any suitable mechanism, such as physical absorption, chemical absorption, chemisorption, physisorption, adsorption, pressure swing adsorption, temperature swing adsorption, or the like.

"Substantial" when used in reference to a quantity or amount of a material, or a specific characteristic thereof, refers to an amount that is sufficient to provide an effect that the material or characteristic was intended to provide. The exact degree of deviation allowable may depend, in some cases, on the specific context.

The term "sweetened gas stream" refers to a fluid stream in a substantially gaseous phase that has had at least a portion of acid gas components removed.

Overview

The present techniques provide methods and systems for decreasing maldistribution of liquids and gases in packed towers that are subject to tilting or motion. Such towers may be located on floating platforms, such as the ocean vessel discussed with respect to FIG. 1, or on barges designed for lakes, bayous, and smaller bodies of water. Towers that are less vulnerable to motion may also lower the costs of using temporary skid mounted equipment in locations subject to slower movements, such as fields located in areas subject to frost heaving. The techniques include liquid distribution systems that evenly distribute liquids over packed beds. Further, in embodiments, vapor distribution plates can be used to mix and distribute vapors in the space between packed beds. In some embodiments, vertical plates are used to separate the beds into regions that are isolated from other regions, decreasing the maldistribution of liquid flows.

FIG. 1 is a drawing of a floating processing and storage vessel (FPSO) 100 that uses separation towers 102. The FPSO 100 is configured to both process and store hydrocarbons produced from sub-sea hydrocarbon fields. The processing of the hydrocarbons at sea may make certain fields more economical for development, for example, by eliminating the need for laying pipelines to on-shore facilities. However, the FPSO 100, and, thus, the separation towers 102 may be subject to tilting, for example, due to uneven filling of storage tanks or ballast chambers. Further, the separation towers 102 may sway, due to wave action on the FPSO 100.

The titling and swaying may contribute to a substantial efficiency decrease for the column. A column that is tilted just over 1° from a vertical orientation may show only a mild decline in efficiency. However, a column that is tilted between 3° and 5° from a vertical orientation can lose as much as 20% to 40% efficiency. Columns that are tilted by more than 5% will have very poor efficiency. As more oceanic developments are pursued, techniques that compensation for this motion will be increasing important.

Figure 2:
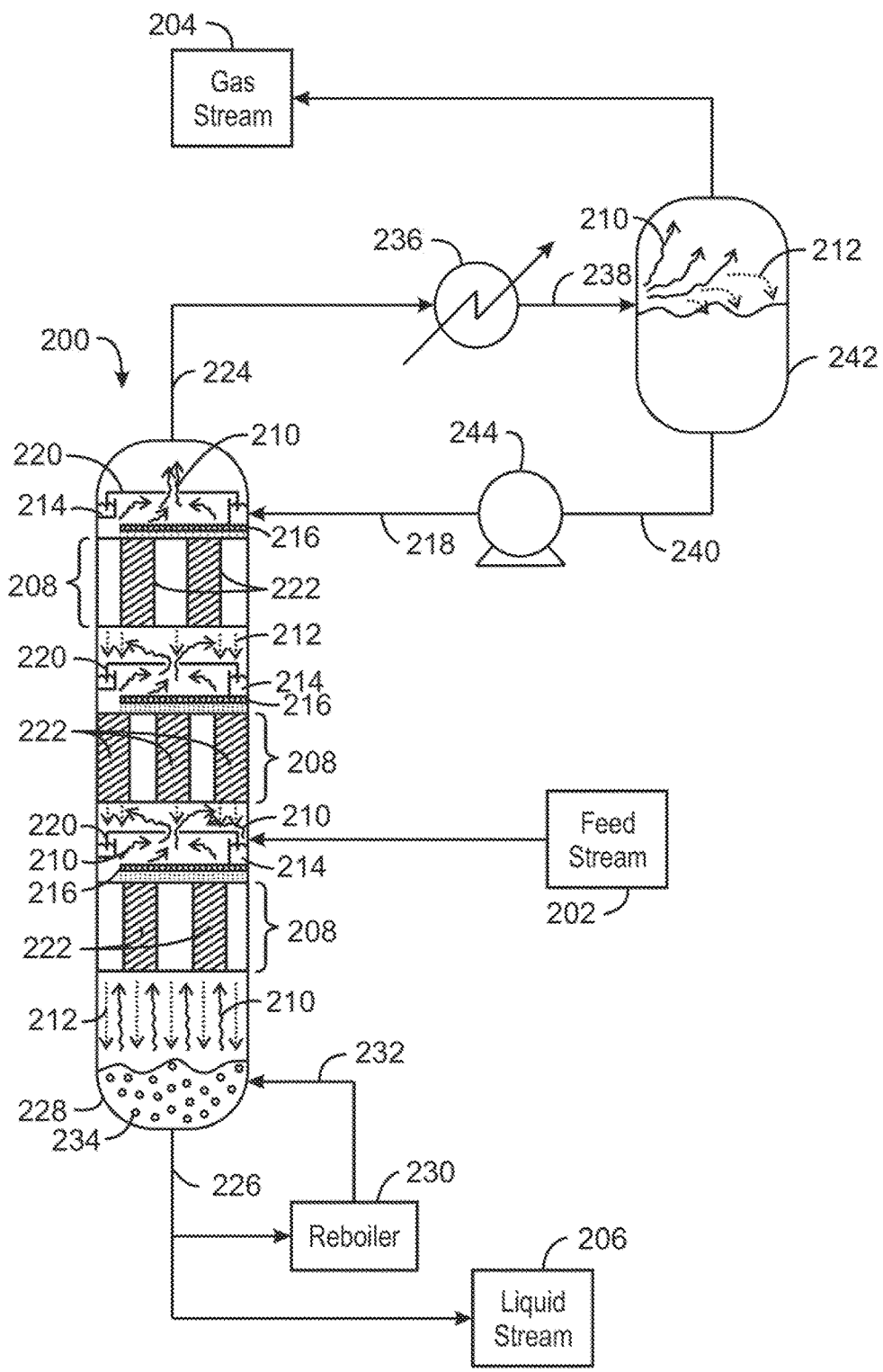
FIG. 2 is a schematic of a separation tower showing systems configured to decrease maldistribution of vapors and liquids in the separation tower.

FIG. 2 is a schematic of a separation tower 200 showing systems configured to decrease maldistribution of vapors and liquids in the separation tower. The separation tower 200 separates a feed stream 202 into a gas stream 204 and a liquid stream 206. The feed stream 202 may include two or more different components with different boiling points and vapor pressures, such as an absorbent solvent and a gas contaminant, or hydrocarbons having different molecular weights.

The separation tower 200 may include a number of packed beds 208 or other internals that create indirect flow paths for the feed stream 202 and increase the interfacial area between a gas phase 210 and a liquid phase 212. The feed stream 202 may be injected into a lower or middle portion of the separation tower 200, for example, above a liquid head 214 that feeds a liquid distributor 216. The gas phase 210 within the feed stream 202 moves upward and through the packed beds 208. At the same time, the liquid phase 212 within the separation tower 200 moves downward and through the packed beds 208 in the separation tower 200. In addition to the feed stream 202, a liquid reflux stream 218 can be injected into the top portion of the separation tower 200, for example, above a liquid head 214 feeding a liquid distributor 216.

The separation tower 200 may be configured to perform a variety of separation technologies, depending on the species in the feed stream 202. For example, the column may be a distillation column or a regeneration column, among others.

For distillation, the feed stream 202 includes a mixture of materials, such as hydrocarbons, with different boiling points. In this case, the separation tower 200 functions to separate the species by the differences in boiling point. The packed beds 208 determine the number of theoretical plates, and, thus, the separation efficiency of the column 200.

For regeneration, the feed stream 202 includes a liquid phase 212 that contains a dissolved or adsorbed gas. As the liquid phase 212 falls through the separation tower 200, the gas is released as the gas phase 210, and exits through the top.

In separation towers 200 mounted in environments subject to tilting or motion, such as ocean going vessels, the separation tower 200 can be modified to decrease maldistribution of the vapor phase 210, the liquid phase 212, or both. For example, in embodiments, the liquid phase 212 can be flowed through a liquid distributor 216 that uses the higher pressure of the liquid head 214 to keep a series of closed channels liquid full, as discussed with respect to FIG. 3. The closed channels minimize the effect of sloshing that can result in open channels, while the pressure of the liquid head 214 can keep the channels full, providing even distribution of the liquid over a packed bed 208. Orifices located on upper surfaces of the channels can allow gas to escape without causing uneven distribution.

The maldistribution of the vapor phase 210 can be decreased by a vapor distribution plate 220. As discussed with respect to FIGS. 4-9, the vapor distribution plate 220 mixes a vapor phase 210 rising from a lower packed bed 208 prior to introducing the vapor phase 210 to a higher packed bed.

Any maldistribution of the liquid phase 212 flowing through the packed beds 208 can be decreased by the insertion of divider plates 222 within the packed beds 208. The divider plates 222 can prevent or decrease the liquid phase 212 from flowing between regions in the packed bed. The divider plates 222 can form separate isolated compartments in the packed bad 208, or may be placed to form barriers along an axis in the bed.

The gas phase 210 may be flowed out of the top of the separation tower 200 as an overhead gas stream 224, while the liquid phase 212 may be flowed out of the bottom of the separation tower 200 as a bottoms liquid stream 226. In addition, some amount of liquid may be allowed to form a pool 228 in the bottom of the separation tower 200 before being flowed out of the column 200 in order to provide for increased separation of the gas phase 210 from the liquid phase 212.

A portion of the bottoms liquid stream 226 can be removed as the liquid stream 206, which contains an enhanced concentration of the liquid product. Another portion of the bottoms liquid stream 226 may be flowed through a reboiler 230. The reboiler 230 increases the temperature of the bottoms liquid stream 226, vaporizing a portion of the bottoms liquid stream 226, which may include components in the liquid, or a portion of the liquid itself. The resulting stream 232 may be flowed back into the bottom portion of the column 200 to provide heat to the pool 228 collecting in the bottom of the separation tower 200. As a result, entrained gases may be forced from the liquids in the pool 228, for example, forming gas bubbles 234.

A portion of the overhead gas stream 224 may be cooled and at least partially condensed within a heat exchanger 236. The cooled gas stream 238 may then be separated into the product gas stream 204 and a liquid stream 240 within a flash vessel 242. The liquid stream 240 may be forced back into the top portion of the separation tower 200 by a pump 244 as the reflux stream 218. Within the separation tower 200, the reflux stream 218 may enhance the performance of the separation tower 200 by decreasing the temperature of materials at the top of the separation tower 200, thereby increasing the separation between the liquid phase 212 and the gas phase 210 at that point.

Liquid Distributor

Figure 3:
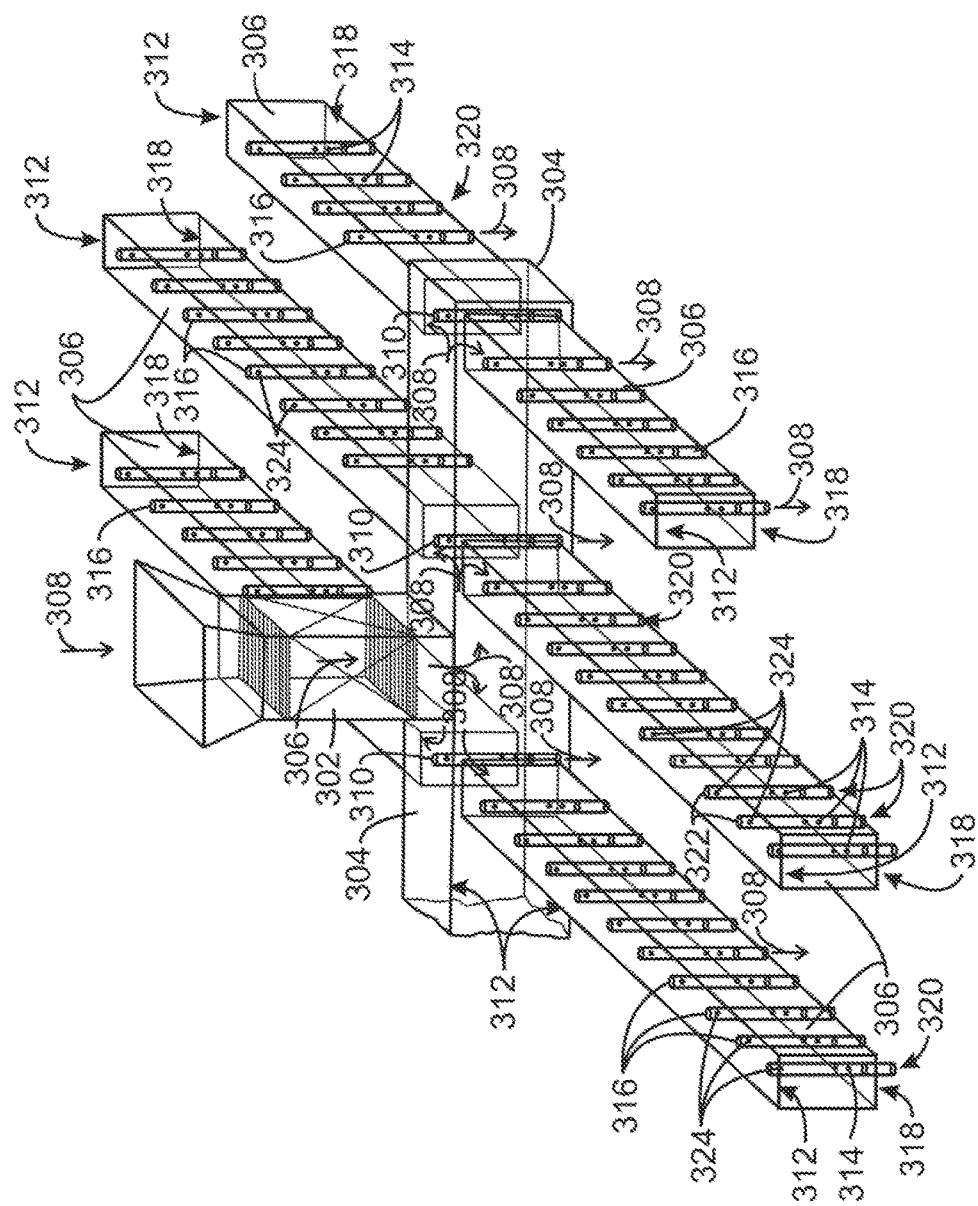
FIG. 3 is a drawing of a liquid distributor for evenly feeding liquids to a packed bed.

FIG. 3 is a drawing of a liquid distributor 300 for evenly feeding liquids to a packed bed. The liquid distributor 300 is configured to uniformly distribute liquid over a packed bed under tilt and swaying conditions. In an embodiment, the packed bed is part of a separation tower that is larger than 3 feet in diameter operating on a floating or semi-floating production facility.

The liquid distributor 300 can include a mixing chamber 302, which collects liquid directly or indirectly from an external feed source or internal reflux. The mixing chamber 302 maintains a high liquid head in a narrow enclosure, reducing sensitivity to liquid motion and static inclination, i.e., tilting. The mixing chamber 302 can be cylindrical, rectangular, or any other shape to suite other internal structures in the separation tower and the installation through a vessel man way. For example, the mixing chamber of the liquid distributor 300 may be coupled to a liquid collection system, such as shown in FIG. 2. The mixing chamber 302 dispenses the liquid into a main channel 304 for distribution. The mixing chamber 302 may contain random or structured packing to reduce liquid velocity and encourage uniform flow to the main channel 304. Alternatively, the main channel 304 may be connected to a pipe to provide a seal, creating a pressurized distributor with a pipe feed.

The main channel 304 is used primarily to reduce liquid velocity and distribute liquid evenly to a number of secondary channels 306. The main channel 304 can have a number of configurations. For example, the main channel 304 can be an elevated parting box. The parting box contains flow guides similar to those in the secondary channels. Metering orifices distribute liquid into each of the secondary channels 306.

In another configuration, as shown in FIG. 3, the main channel 304 can have an integral channel design. In this configuration, the main channel 304 is at the same level as the secondary channels 306. The main channel 304 provides a central location for liquid communication to the secondary channels 306 and also actively distributes liquid 308 to the packed bed with its own drip tubes 310. Ideally, the pitch (spacing) of the drip tubes 310 on the main channel 304 is identical to those of the secondary channels 306. More than one mixing chamber 302 and main channel 304 are possible, depending on the diameter and liquid rate of the separation tower.

One important feature of this invention is that the main channel 304 and secondary channels 306 are completely sealed with a top plate 312 and are liquid full at all times. This eliminates wave action inside the main channel 304 and secondary channels 306 and maintains a uniform liquid head to achieve uniform liquid distribution across the separation tower, even under severe swaying or inclined tower conditions. This allows for multiple stage discharge units, enabling the device to handle a large liquid load operating range and ensuring uniform liquid gravimetric flow to the packing below.

The secondary channels 306 extend laterally from the main channel 304, distributing liquid via metering orifices 314. Drip tubes 316 are used to diffuse liquid 308 flow from the metering orifices 314 and distribute the liquid 308 to a specific location on the top of the packed bed, although, to simplify the drawing, this is not shown in FIG. 3 for every drip tube 316. The metering orifices 314 can be located in the side walls of the secondary channels 306, in the drip tubes 316, or in both. If the metering orifices 314 are located in the side walls of the secondary channels 306, the drip tubes 316 are located on the outside wall of the secondary channels 306, extending from the top of the secondary channels 306 to 2-3 in below the bottom of the secondary channels 306. In this embodiment, metering orifices in the walls of the secondary channels 306 feed the drip tubes 316.

If the metering orifices 314 are located in the drip tubes 316, the drip tubes 316 extend completely through the bottom plates 318 and top plates 312 of the secondary channels 306. The metering orifices 314 in the drip tubes 316 meter flow to each drip tube 316. The bottom opening 320 of the drip tube 316 serves to distribute the liquid 308 to the packed bed while the top opening 322 provides proper venting to prevent choked flow, e.g., by releasing gases.

In various embodiments, the liquid distributor 300 can be designed with one or more levels of metering orifices 314 to accommodate large liquid rates and large turndown ratios. The lowest location of a metering orifice 314 may be at least two inches above the floor of the secondary channels 306. This may lessen the risk for plugging under severe fouling conditions. One metering orifice 314 can be located at the top of a sidewall drip tube 316. This allows full venting of the distributor 300 upon introduction of liquid feed.

The design of the mixing chamber 302 can maintains a high liquid head in a narrow enclosure, making the distributor 300 insensitive to motion and static inclination, but reducing total liquid inventory. The distributor 300 maintains the channel design with elevated orifices 314 in the sidewalls or drip tubes, as opposed to spray or pipe distributors with orifices on the pipe bottom. This design for the distributor 300 can improve the distributor performance in fouling services and eliminate issues associated with high velocity liquid discharging directly into packing. Furthermore, each drip tube 316 can have multiple levels of metering orifices 314, enabling larger operating ranges of liquid rates.

In an embodiment, at least one of the metering orifices 324 is placed at the top of channel 304 or 306. This placement allows for full venting of the sealed distributor 300 upon introduction of the liquid feed. This also incorporates a venting mechanism into the drip point layout, avoiding complicated tubing assembly or spurious release of liquid into an undesired location.

Vapor Mixing and Redistribution

Figure 4:
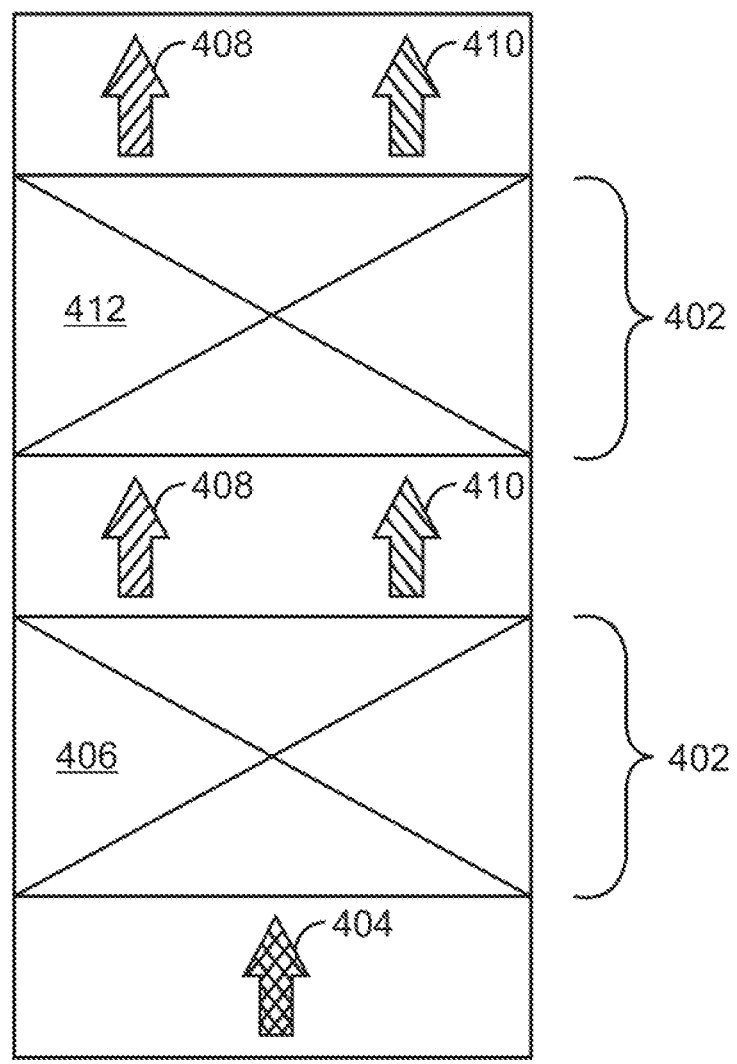
FIG. 4 is a schematic showing the maldistribution of the gas phase that can occur in a packed bed.

FIG. 4 is a schematic of a separation tower 400 showing the maldistribution of the gas phase that can occur in a packed bed 402. As shown in the schematic, a uniform or mixed gas phase 404 is introduced to a first packed bed 406. Due to tilting or swaying, vapor maldistribution may occur due to inefficient contacting in portions of the bed, for example, due to a hydraulic gradient imposed by uneven liquid flow, resulting in a plurality of gas-phase flow rates and compositions exiting the first packed bed 406 as gas phases 408 and 410. The gas phases 408 and 410 may continue to a subsequent packed bed 412 without mixing. Feeding a maldistributed vapor to the subsequent packed bed 412 can substantially reduce the efficiency of the packing, and propagate the vapor maldistribution into other packed beds.

Figure 5:
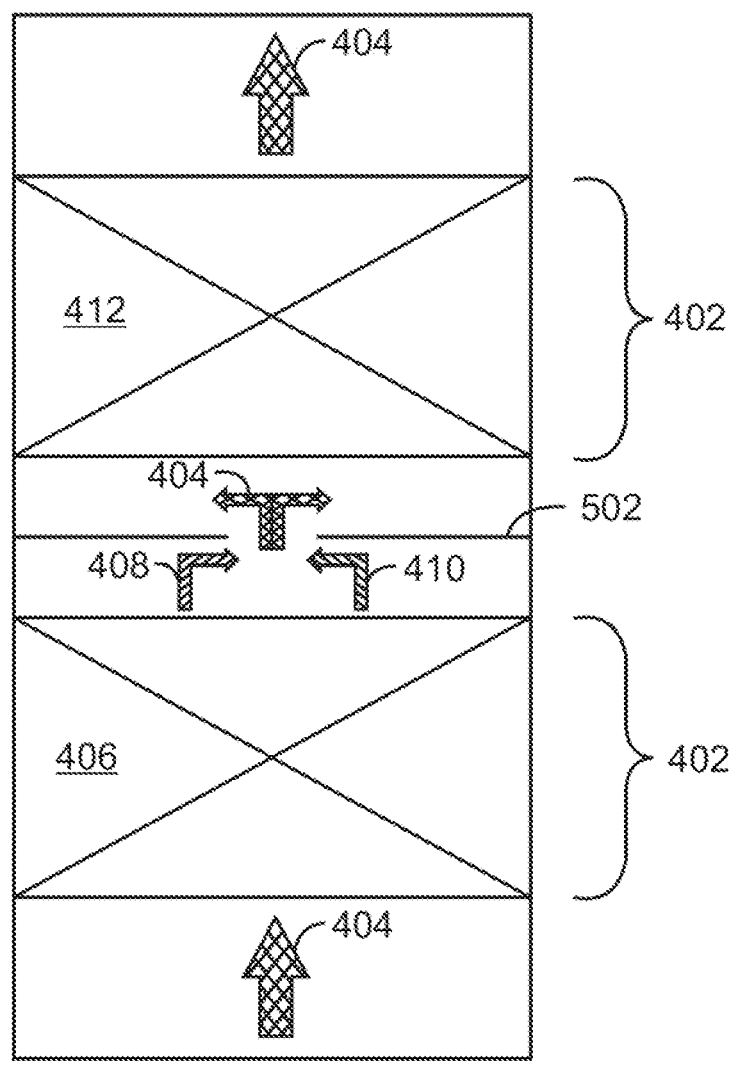
FIG. 5 is a schematic of a separation tower having a vapor redistribution plate used to mix gas phases rising from a first packed bed.

FIG. 5 is a schematic of a separation tower 500 having a vapor redistribution plate 502 used to mix gas phases 408 and 410 rising from a first packed bed 406. Like numbered items are as described with respect to FIG. 4. By forcing the gas phases 408 and 410 to mix, and reform the mixed gas phase 404, the second packed bed 412 will receive a uniform feed, and the performance of the packing can be improved. The vapor redistribution plate 502 can have any number of configurations, including baffles, mixing tubes, and the like, as described with respect to FIGS. 6-9.

Figure 6:
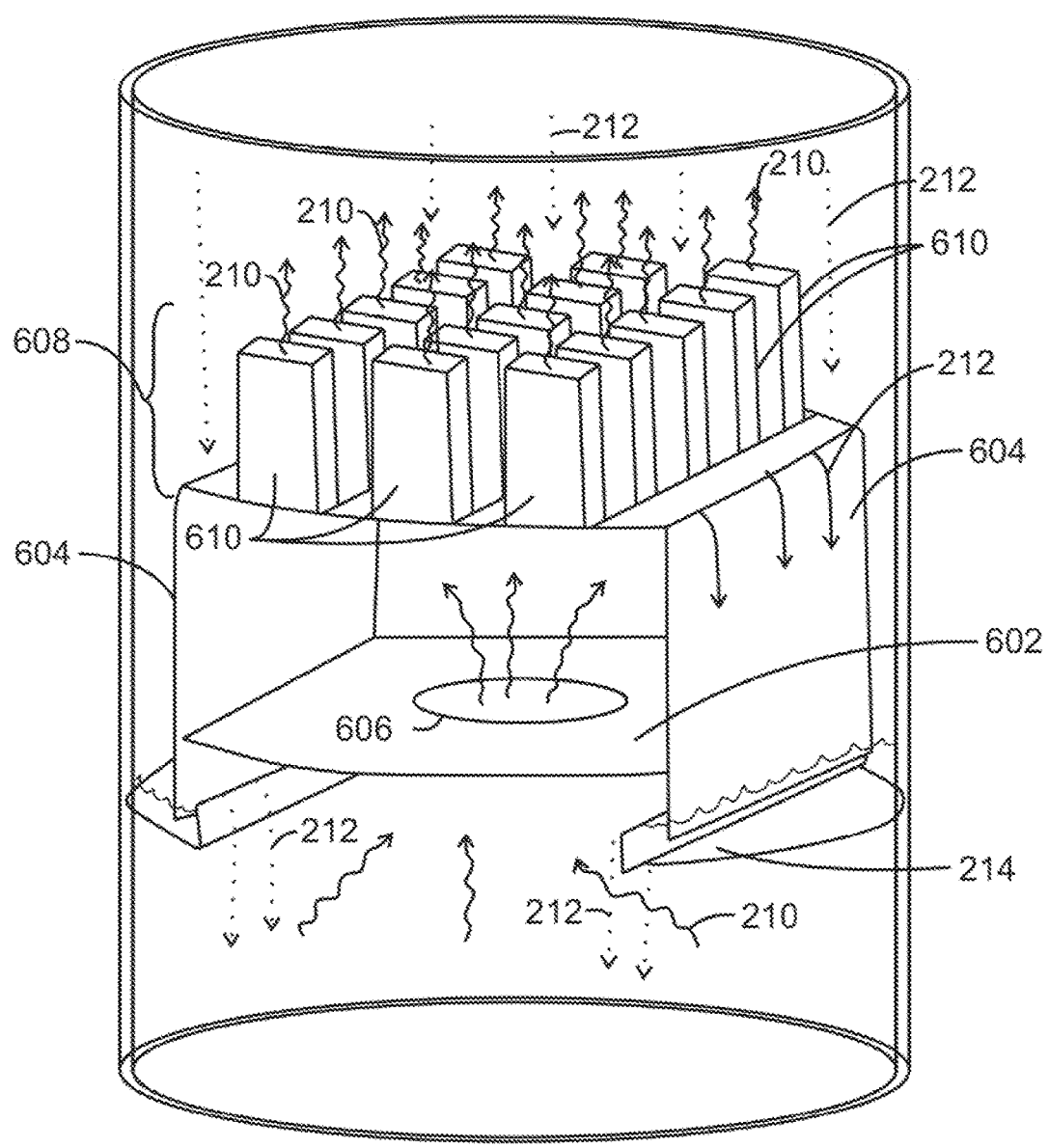
FIG. 6 is a cut-away view of a separation tower showing a vapor redistribution plate.

FIG. 6 is a cut-away view of a separation tower 600 showing a vapor redistribution plate 602. Like numbered items are as described with respect to FIG. 2. As shown in FIG. 6, the simplest configuration for the vapor redistribution plate 602 is a baffle, which may be constructed of metal or other suitable material. The vapor redistribution plate 602 is sealed to the sides of the separation tower 600 and to liquid downcomers 604 to block the outer annulus of the separation tower 600.

An orifice or opening 606 in the middle of the vapor redistribution plate 602 forces the gas phase 210 coming from a lower packed bed to re-mix. Above the vapor redistribution plate 602, a chimney tray 608 or orifice plate with uniformly distributed vapor channels 610 provides a pressure drop to ensure even flow distribution across the cross section of the separation tower 600. The liquid phase 212 flows down the downcomers 604 to a liquid pool 214 with a liquid head that blocks the gas phase 210 from flowing up the downcomers 604. Although downcomers 604 are shown, any number of other systems for liquid distribution, including downpipes, may be used. In one embodiment, the liquid pool 214 is integrated into the mixing chamber 302 of the liquid distribution system 300 described with respect to FIG. 3.

Figure 7:
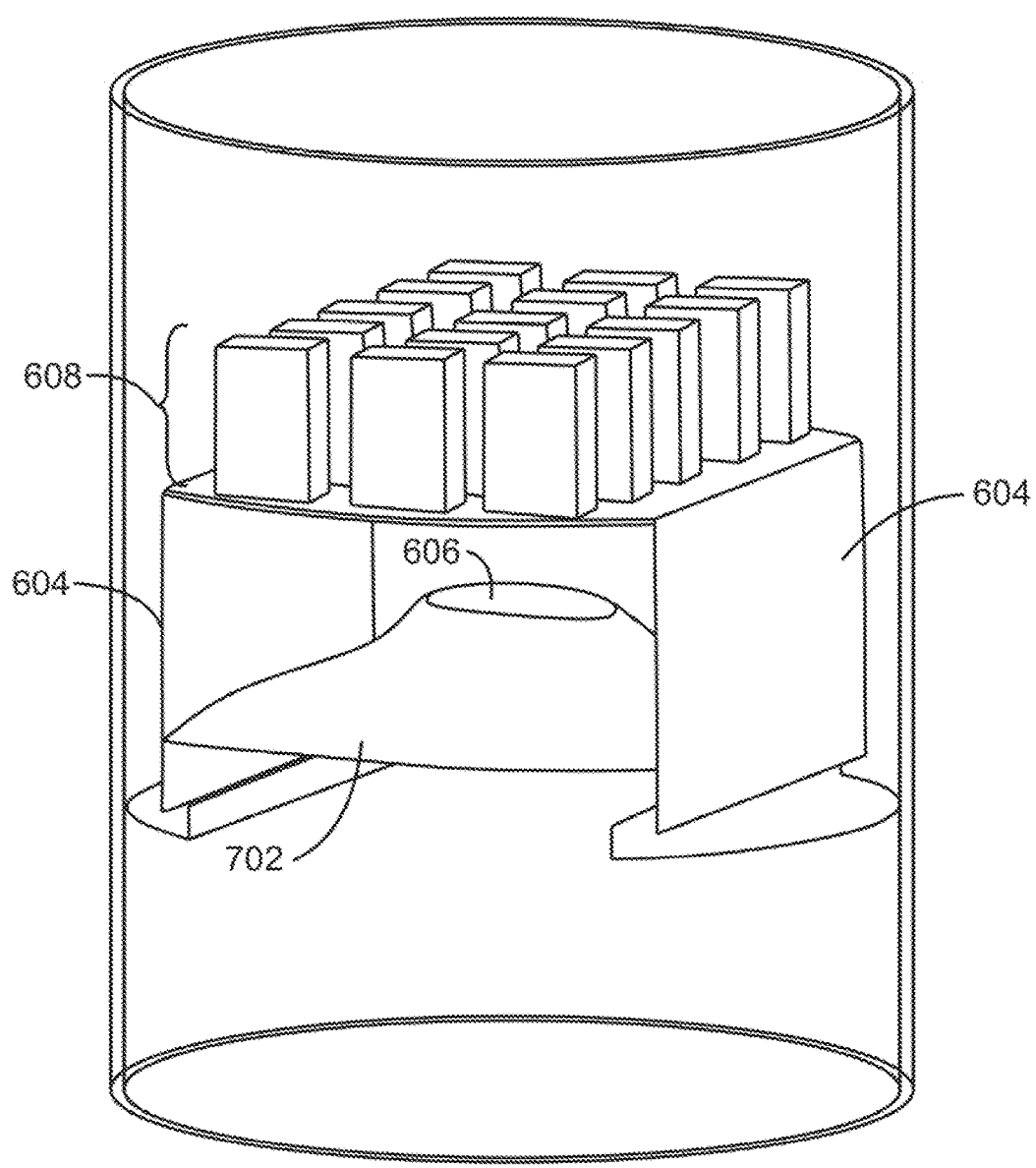
FIG. 7 is a cut-away view of a separation tower showing another vapor redistribution plate.

FIG. 7 is a cut-away view of a separation tower 700 showing another vapor redistribution plate 702. Like numbered items and material flows are as described with respect to FIG. 6. As shown in FIG. 7, the vapor redistribution plate 702 may be sloped or curved upwards towards the column centerline to provide a lower pressure drop. In an embodiment, the opening vapor redistribution plates 602 or 702 may hold a static mixer to improve vapor mixing.

Figure 8:
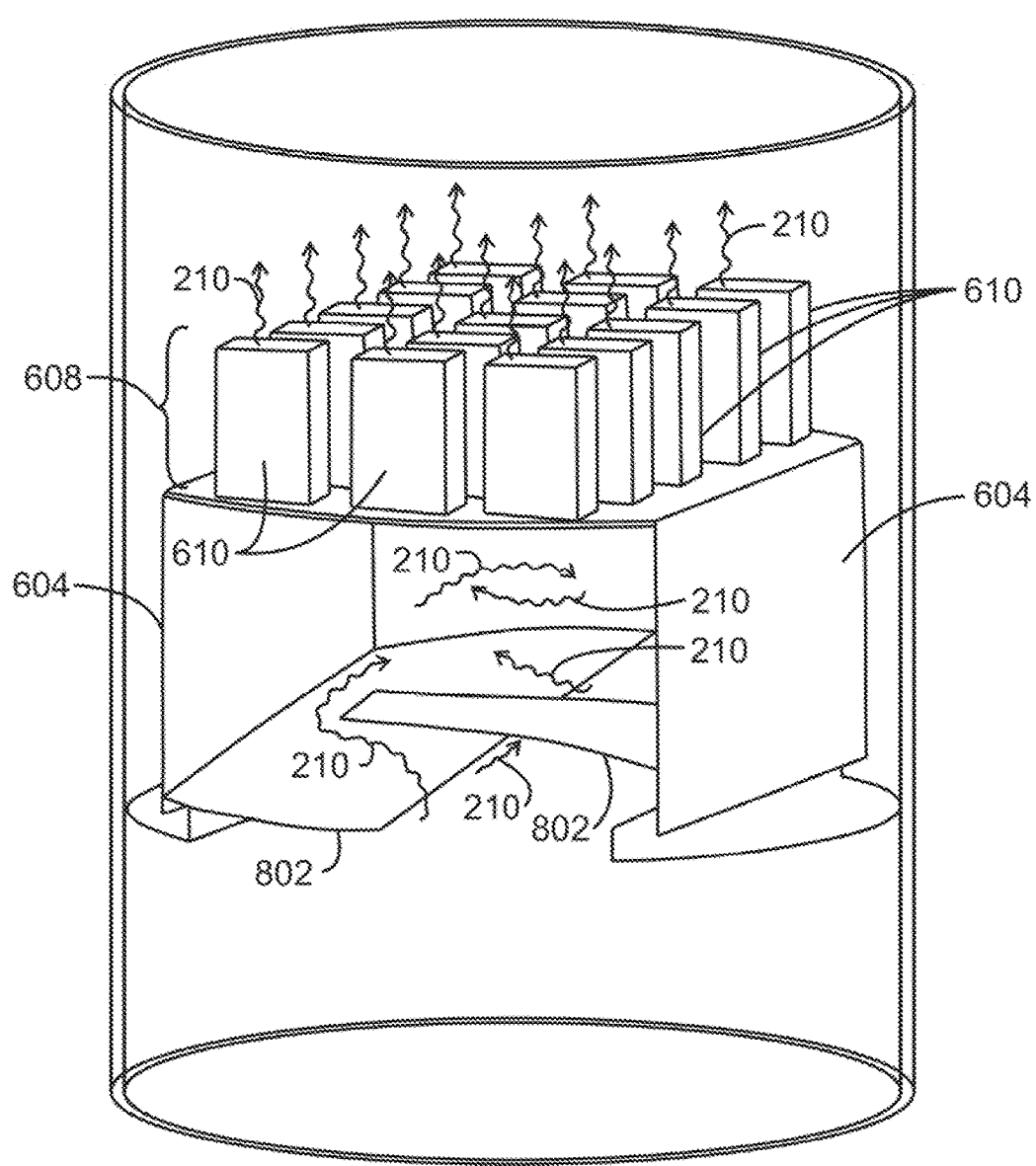
FIG. 8 is a cut-away view of a separation tower showing another vapor redistribution plate.

FIG. 8 is a cut-away view of a separation tower 800 showing another vapor redistribution plate 802. Like numbered items are as discussed with respect to FIGS. 2 and 6. In this embodiment, the vapor redistribution plate 802 utilizes multiple baffle plates designed to split and recombine the gas phase 210. The baffles plates may be sloped in opposition as shown in FIG. 8, which can impart a spiral motion to the flowing gas phase 210. In other embodiments, other configurations may be used for the baffle plates, for example, sloped baffle plates that are divided into multiple sections to form a propeller like configuration.

The vapor redistribution plates are not limited to using baffle plates that have openings. Other configurations may be used to mix and redistribute the vapor streams, for example, as shown in FIG. 9.

Figure 9:
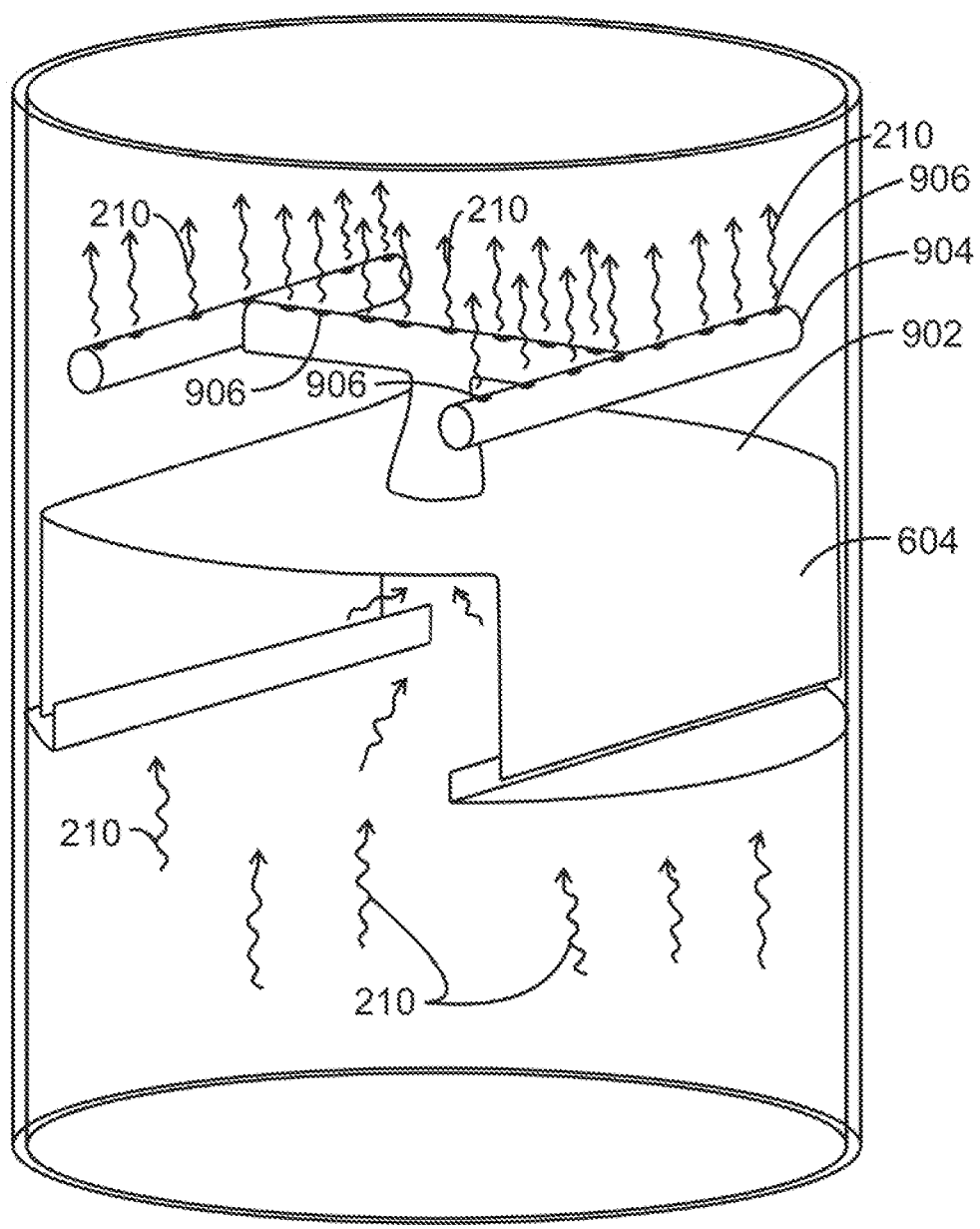
FIG. 9 is a cut-away view of a separation tower showing a vapor redistribution plate that has a pipe distributor for the gas phase.

FIG. 9 is a cut-away view of a separation tower 900 showing a vapor redistribution plate 902 that has a pipe distributor 904 for the gas phase 210. The pipe distributor 904 contains multiple orifices 906 and is configured to evenly feed the gas phase 210 flow to a next higher packing bed. In this embodiment, a separate chimney tray 608, such as discussed with respect to FIG. 6, would not be used, decreasing the height of the separation tower 900.

Divider Plates

In addition to the maldistribution of liquid and vapors in the space between the packed beds, there can also be maldistributions within packed beds. For example, a liquid in a packed bed may flow from one side to the other in a tilted tower, decreasing the amount of contact between liquids and vapors. Accordingly, embodiments can include divider plates that are configured to decrease liquid flow from one region of a packed bed to another region of the packed bed. In some embodiments, these divider plates can also decrease maldistribution of vapors as well.

Figures 10A, 10B:
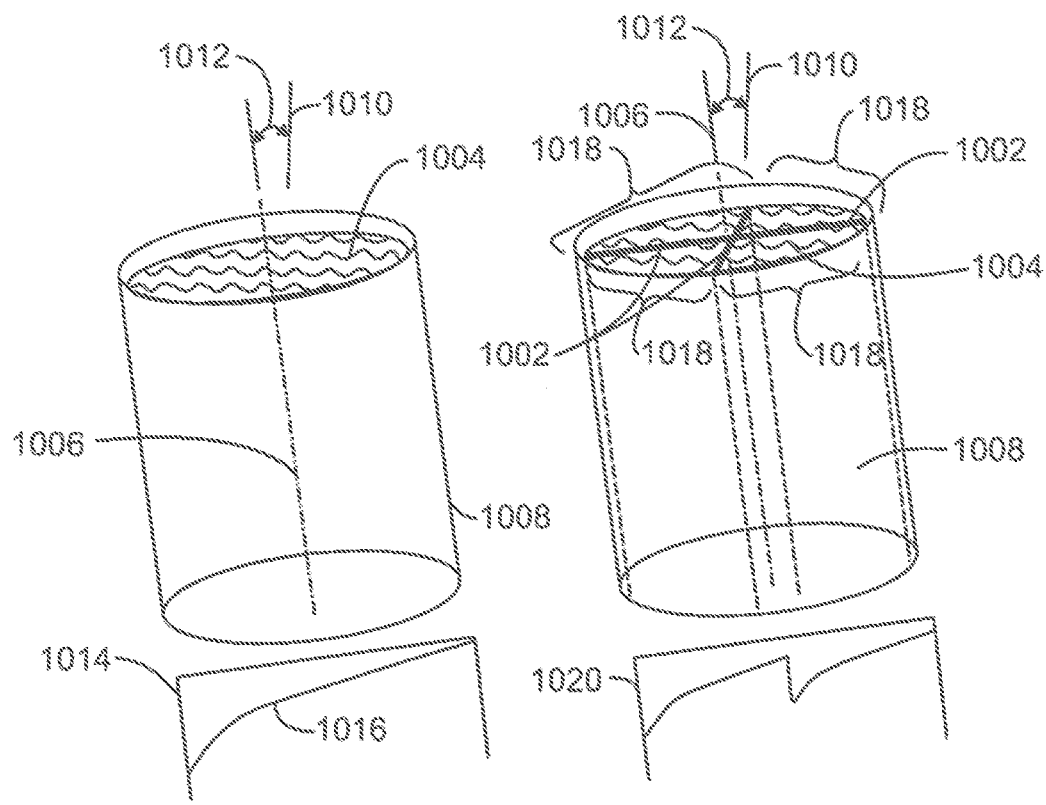
FIGS. 10A and 10B are drawings showing the use of divider plates to decrease the maldistribution of liquids in a packed bed.

FIGS. 10A and 10B are drawings showing the use of divider plates 1002 to decrease the maldistribution of liquids in a packed bed 1004. In FIG. 10A, the axis 1006 of a separation tower 1008 is tilted from the vertical axis 1010 by an angle 1012. As illustrated by a distribution graph 1014, the amount of liquid 1016 at the lower side of the packed bed 1004 is increased. In an embodiment, the divider plates 1002 are placed in the packed bed 1004, parallel to the axis 1006 of the separation tower 1008 in such a way that they divide the cross-sectional area of the separation tower 1008 into compartments 1018. The divider plates 1002 can be thin sheets of metal, or other materials. When the separation tower 1008 tilts, the divider plates 1002 provide resistance for liquid flowing across the cross-section of the separation tower 1008 and forces it to flow parallel to the axis 1006 of the separation tower 1008. Through the use of these divider plates 1002, maldistribution that could occur throughout the entire cross-section of the separation tower 1008 is restricted to the individual compartments 1018, as indicated by a distribution graph 1020 in FIG. 10B. The divider plates 1002 may promote wall-flow, in which the liquid preferentially flows down in contact with the divider plates 1002, affecting the performance of the separation tower 1008. However, a number of design features can be chosen or tuned, depending on the specific nature of the tower service, to decrease this effect, and optimize the performance of the separation tower 1008.

Figure 11:
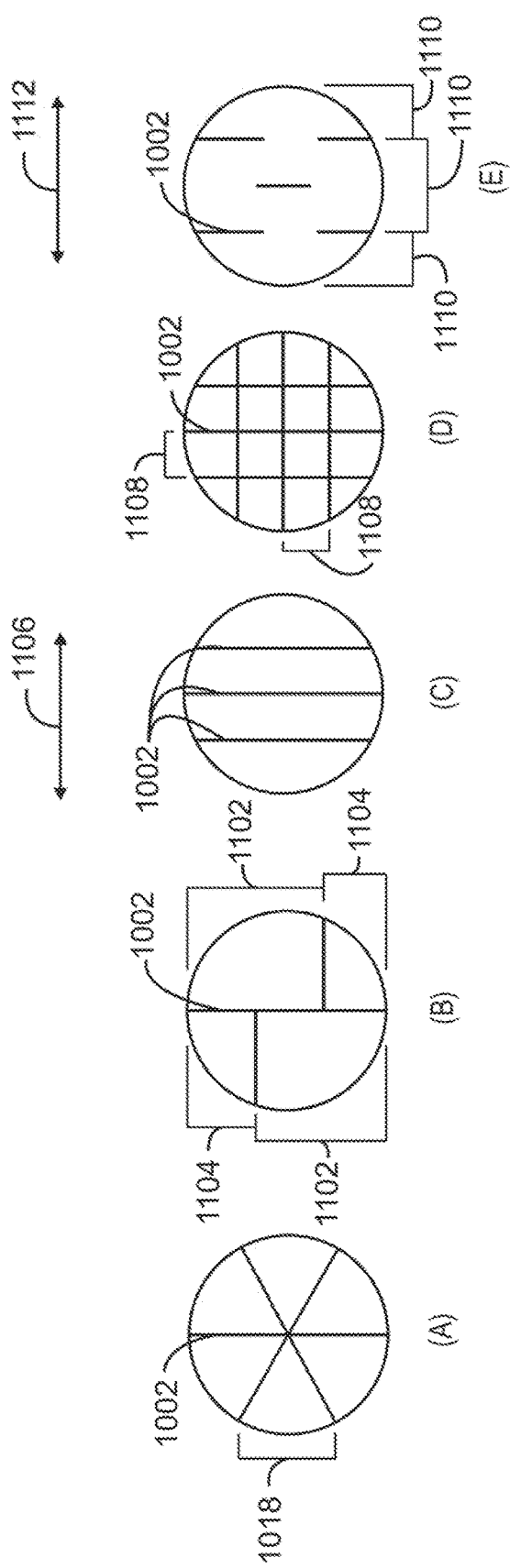
FIGS. 11A-E are drawings that show a top view of a packed bed 1004 with various placements for the divider plates.

FIGS. 11A-11E are drawings that show a top view of a packed bed 1004 with various placements for the divider plates 1002. Like numbered items are as discussed with respect to FIG. 10. The placement of the divider plates 1002 can be selected to form symmetrical compartments 1018 as shown in FIG. 11A. In other embodiments, the plates may be selected to form two or more asymmetrical compartments 1102 and 1104, as shown in FIG. 11B. The choice of these arrangements may be made using any number of factors, such as the size of the compartments, the ratio of the size of the compartments to the packing material, the ratio of the wall surface area to the volume of the compartments, the amount of expected motion, the amount of efficiency that can be sacrificed versus the resistance to tilt, and the like.

Other arrangements may include preferential resistance to flow in certain directions, as shown in FIG. 11C. The divider plates 1002 in FIG. 11C can be aligned perpendicular to a motion vector 1106, for example, with the plates placed in parallel with the keel of an ocean going vessel, such as an FPSO. In applications where substantial motion is expected in all directions, the divider plates 1002 may be placed to create smaller compartments 1108 as shown in FIG. 11D.

Smaller tilting and motions may allow for designs that inhibit liquid flow while allowing vapor to flow throughout the column. For example, the open compartment 1110 shown in FIG. 11E may decrease liquid flow along a motion vector 1112, while allowing vapor flow throughout the separation tower.

Figure 12:
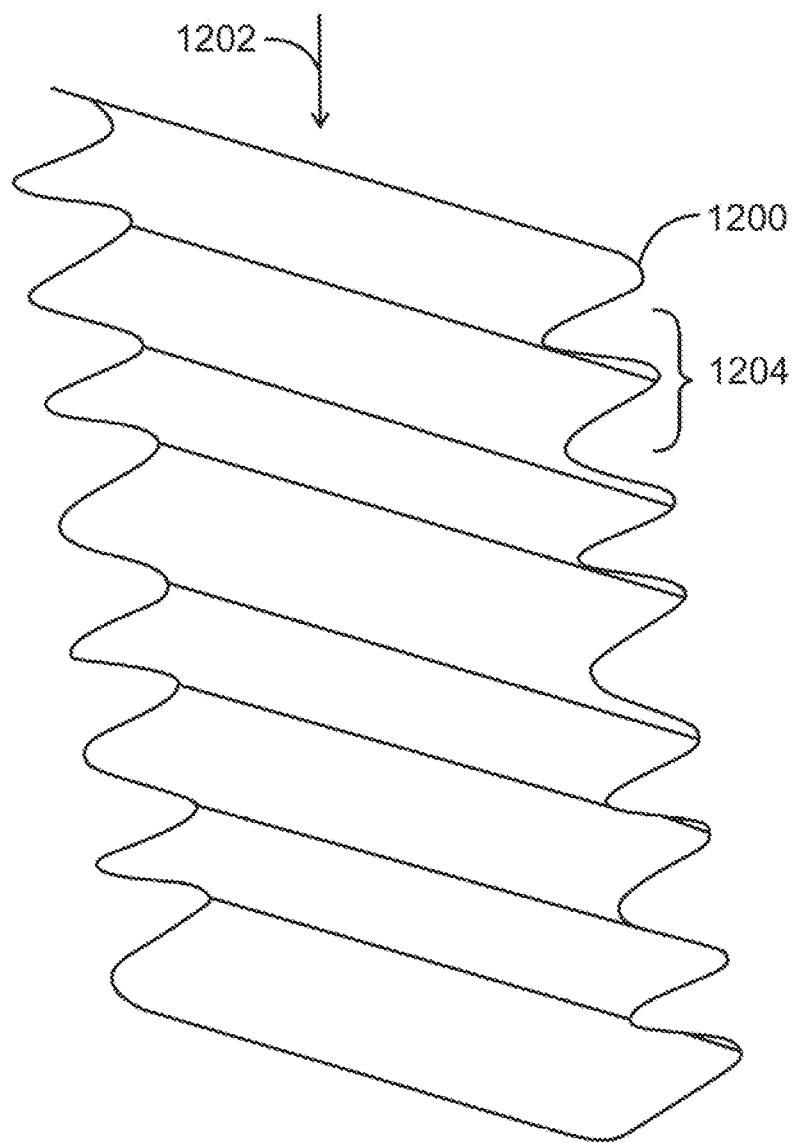
FIG. 12 is a drawing of a corrugated divider plate.

FIG. 12 is a drawing of a corrugated divider plate 1200. This divider plate 1200 is mounted in a packed bed so that the liquid flow 1202 is down the corrugations 1204. As a result, the liquid may flow from the divider plate 1200 onto packing that is in contact with the divider plate 1200 or may drip off the divider plate 1200 itself. The divider plate 1200 may have other surface shapes, undulations, or patterns to inhibit wall-flow.

Figure 13:
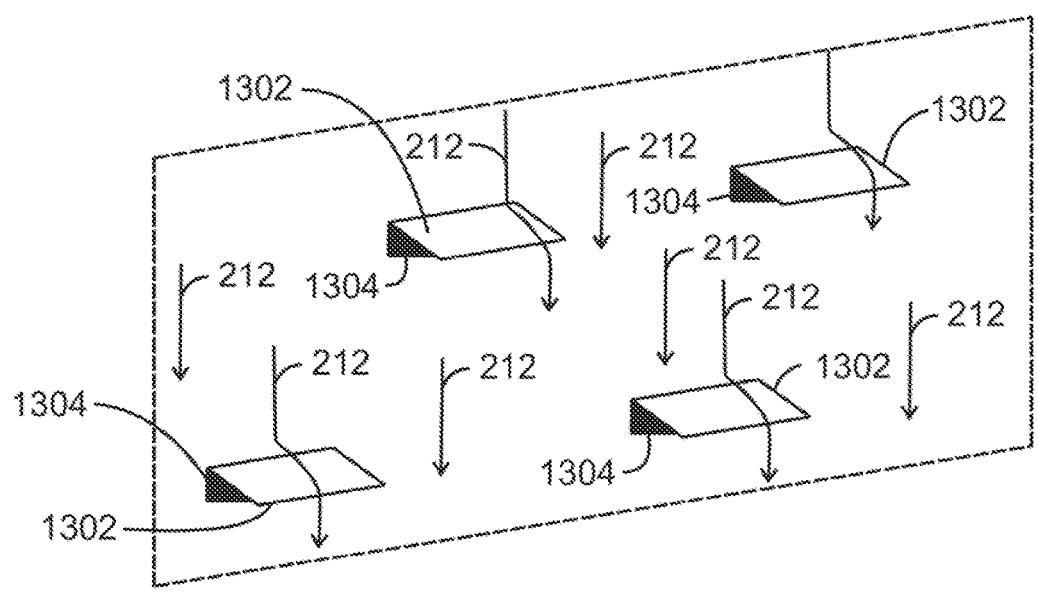
FIG. 13 is a drawing of a divider plate with tabs.

FIG. 13 is a drawing of a divider plate 1300 with tabs 1302. Like number items are as described with respect to FIG. 2. The tabs 1302 can be short metal strips that project out of the surface of the divider plate 1300 to direct the flow of the liquid phase 212 into the separation tower, inhibiting wall flow. For example, the tabs 1302 may be formed by holes cut into the divider plate 1300 on three sides, then folded out from the divider plate 1300. This arrangement can leave holes 1304 that make the compartments more open to promote vapor flow and mixing between compartments. The tabs 1302 may also be formed by welding bent metal plates to the divider plate 1300 or by attaching any number of other items to the surface of the divider plate 1300.

Figure 14:
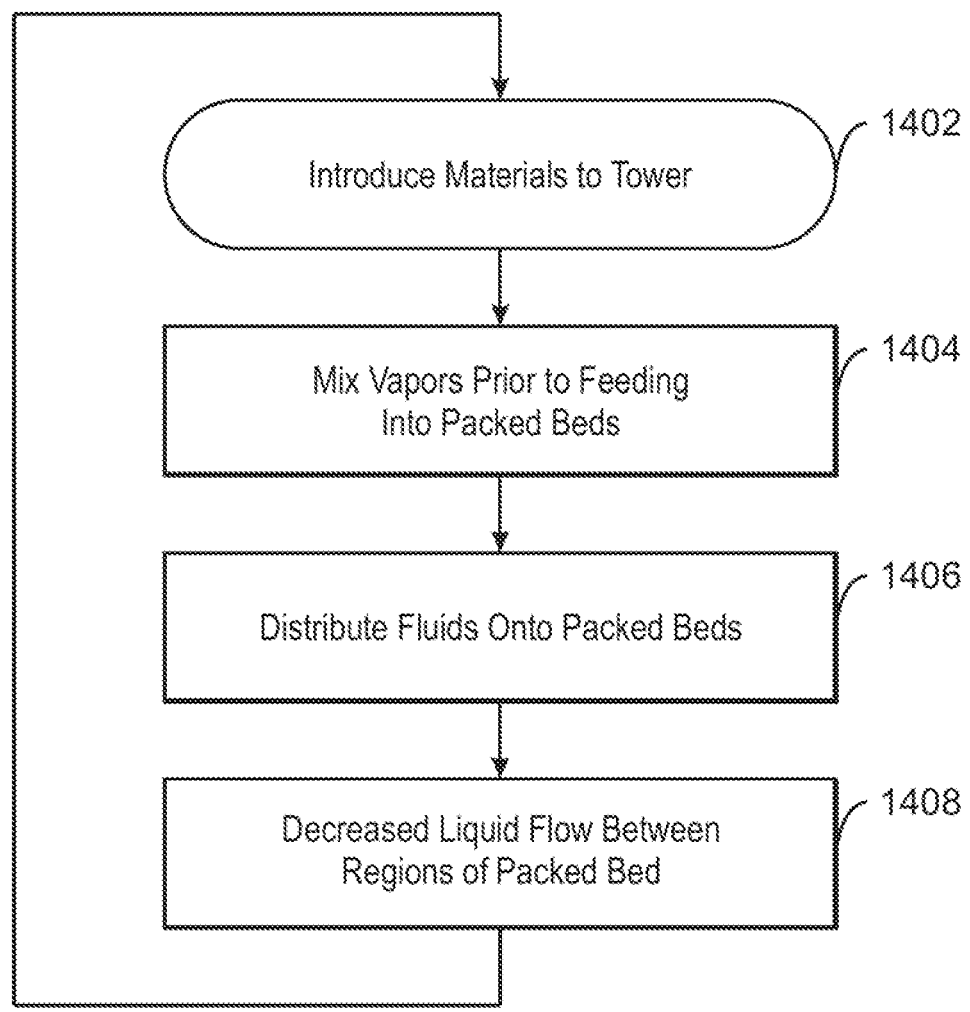
FIG. 14 is a process flow diagram of a method for decreasing maldistribution in a separation tower.

FIG. 14 is a process flow diagram of a method 1400 for decreasing maldistribution in a separation tower. The method 1400 begins at block 1402 with the introduction of a feed stream into the tower. At block 1404, a vapor stream from a lower packed bed is mixed before it is fed into an upper packed bed, for example, using the systems described with respect to FIGS. 5-9. At block 1406 liquids are evenly distributed onto a packed bed using a liquid distributor, such as that described with respect to FIG. 3. At block 1408, liquid flow between regions of a packed bed is decreased by the use of divider plates, for example, as described with respect to FIGS. 10-13.

It can be understood that not all of these blocks may be used or needed in every application. Depending on the service, such as the amount of expected motion, height of the separation tower, materials to be separated, and the like, different blocks may be added or removed. For example, the divider plates may not be used when an expected tilting motion has a time constant faster than the movement of the liquid through the packing.

Embodiments

Embodiments of the invention may include any combinations of the methods and systems shown in the following numbered paragraphs. This is not to be considered a complete listing of all possible embodiments, as any number of variations can be envisioned from the description above.

1. A separation system, including:
    a separation tower including at least two packed beds; and
    a vapor redistribution plate disposed between two sequentially disposed packed beds, wherein the vapor redistribution plate is configured to mix a vapor from a lower packed bed before introducing the vapor into an upper packed bed.

2. The separation system of paragraph 1, wherein the vapor redistribution plate includes a baffle that blocks an outer annulus of the separation tower.

3. The separation system of paragraphs 1 or 2, wherein the vapor redistribution plate includes a baffle with an upwards slope to a center opening.

4. The separation system of any of the preceding paragraphs, wherein the vapor redistribution plate includes a static mixer configured to blend the vapor stream.

5. The separation system of any of the preceding paragraphs, wherein the vapor redistribution plate includes a pipe distributor including multiple orifices configured to evenly feed vapor to the upper packed bed.

6. The separation system of any of the preceding paragraphs, wherein the vapor redistribution plate is sealed to a downcomer, wherein the downcomer is configured direct a liquid flow into the lower packed bed while blocking a vapor flow from the lower packed bed.

7. The separation tower of any of the preceding paragraphs, including a divider plate within a packed bed, wherein the divider plate is disposed along the axis of the packed bed, and wherein the divider plate is configured to prevent liquid flow from one area of the packed bed to another area of the packed bed.

8. The separation tower of paragraph 7, wherein the divider plate includes panels placed in the packed bed, wherein the panels are placed along a longitudinal axis to prevent maldistributions caused by tilting along a perpendicular axis.

9. The separation tower of paragraph 8, wherein the longitudinal axis is aligned along a forward and aft axis on a vessel.

10. The separation tower of paragraphs 7 or 8, wherein the divider plate includes a plurality of panels configured to divide the packed bed into a series of substantially symmetric compartments.

11. The separation tower of paragraph 10, wherein the substantially symmetric compartments are hexagonally shaped.

12. The separation tower of any of paragraphs 7-11, wherein the divider plate includes a plurality of panels configured to divide the packed bed into asymmetric compartments.

13. The separation tower of any of paragraphs 7-12, wherein the divider plate includes a plurality of panels configured to inhibit liquid flow from one region of the packed bed to another region of the packed bed, wherein the plurality of panels are not in contact with each other.

14. The separation tower of any of paragraphs 7-13, wherein the divider plate includes a plurality of panels disposed perpendicular to a motion vector to prevent maldistributions caused by tilting along the motion vector.

15. The separation tower of paragraphs 7-14, wherein the divider plate includes a panel with a surface feature configured to inhibit liquid from flowing along the panel.

16. The separation tower of paragraph 15, wherein the surface feature includes an undulation.

17. The separation tower of paragraph 15, wherein the surface feature includes a tab that projects from the panel.

18. The separation tower of any of the preceding paragraphs, including a liquid distributor configured to evenly distribute liquid over a packed bed.

19. The separation tower of paragraph 18, wherein the liquid distributor includes closed channels with a plurality of metering orifices.

20. The separation tower of paragraphs 19, wherein the plurality of metering orifices metering orifices are located at the bottom and the top of the closed channels.

21. The separation tower of paragraph 18, wherein the liquid distributor includes a mixing chamber configured to hold a high liquid head.

22. A sea going vessel comprising:
a separation tower comprising at least two packed beds; and
a vapor redistribution plate disposed between two sequentially disposed packed beds, wherein the vapor redistribution plate is configured to mix a vapor from a lower packed bed before introducing the vapor into an upper packed bed.

23. The sea going vessel of paragraph 22, including a divider plate within a packed bed, wherein the divider plate is disposed along the axis of the packed bed, and wherein the divider plate is configured to prevent liquid flow from one area of the packed bed to another area of the packed bed.

24. The sea going vessel of paragraphs 22 or 23, including a liquid distributor configured to evenly distribute liquid over a packed bed.

25. The sea going vessel of any of paragraphs 22-24, including processing facilities for hydrocarbons.

26. The sea going vessel of any of paragraphs 22-25, including storage facilities for hydrocarbons.

27. A method for decreasing maldistribution of materials in a separation tower, including mixing vapor rising from a top of a first packed bed before introducing the vapor to a bottom of a second packed bed.

28. The method of paragraph 27, including preventing liquid flow between adjacent regions in a packed bed.

29. The method of paragraphs 27 or 28, including evenly distributing liquid into a packed bed from a liquid distribution system including sealed channels and a mixing chamber with a high liquid head.

While the present techniques may be susceptible to various modifications and alternative forms, the embodiments discussed above have been shown only by way of example. However, it should again be understood that the techniques is not intended to be limited to the particular embodiments disclosed herein. Indeed, the present techniques include all alternatives, modifications, and equivalents falling within the true spirit and scope of the appended claims.

What is claimed is:

1. A separation system, comprising:
a separation tower comprising at least two packed beds;
a vapor redistribution plate disposed between two sequentially disposed packed beds, wherein the vapor redistribution plate is configured to mix a vapor from a lower packed bed before introducing the vapor into an upper packed bed; and
a divider plate within a packed bed, wherein the divider plate is disposed along the axis of the packed bed, wherein the divider plate is positioned to prevent liquid flow from one area of the packed bed to another area of the packed bed, and wherein the divider plate comprises a panel with a surface feature configured to inhibit liquid from flowing along the panel, and further wherein the surface feature comprises a tab that projects from the panel.

2. The separation system of claim 1, wherein the vapor redistribution plate comprises a baffle that blocks an outer annulus of the separation tower.

3. The separation system of claim 1, wherein the vapor redistribution plate comprises a baffle with an upwards slope to a center opening.

4. The separation system of claim 1, wherein the vapor redistribution plate comprises a static mixer configured to blend the vapor stream.

5. The separation system of claim 1, wherein the vapor redistribution plate comprises a pipe distributor comprising multiple orifices configured to evenly feed vapor to the upper packed bed.

6. The separation system of claim 1, wherein the vapor redistribution plate is sealed to a downcomer, wherein the downcomer is configured direct a liquid flow into the lower packed bed while blocking a vapor flow from the lower packed bed.

7. The separation system of claim 1, wherein the divider plate comprises panels placed in the packed bed, wherein the panels are placed along a longitudinal axis to prevent maldistributions caused by tilting along a perpendicular axis.

8. The separation system of claim 7, wherein the longitudinal axis is aligned along a forward and aft axis on a vessel.

9. The separation system of claim 1, wherein the divider plate comprises a plurality of panels positioned to divide the packed bed into a series of substantially symmetric compartments.

10. The separation system of claim 9, wherein the substantially symmetric compartments are hexagonally shaped.

11. The separation system of claim 1, wherein the divider plate comprises a plurality of panels positioned to divide the packed bed into asymmetric compartments.

12. The separation system of claim 1, wherein the divider plate comprises a plurality of panels configured to inhibit liquid flow from one region of the packed bed to another region of the packed bed, wherein the plurality of panels are not in contact with each other.

13. The separation system of claim 12, wherein the divider plate comprises a plurality of panels disposed perpendicular to a motion vector to prevent maldistributions caused by tilting along the motion vector.

14. A separation system, comprising:
a separation tower comprising at least two packed beds;
a vapor redistribution plate disposed between two sequentially disposed packed beds, wherein the vapor redistribution plate is configured to mix a vapor from a lower packed bed before introducing the vapor into an upper packed bed; and
a divider plate within a packed bed, wherein the divider plate is disposed along the axis of the packed bed, wherein the divider plate is positioned to prevent liquid flow from one area of the packed bed to another area of the packed bed, and wherein the divider plate comprises a panel with a surface feature configured to inhibit liquid from flowing along the panel, wherein the surface feature comprises an undulation.

15. The separation system of claim 1, comprising a liquid distributor configured to evenly distribute liquid over a packed bed, wherein the liquid distributor comprises closed channels with a plurality of metering orifices.

16. The separation system of claim 15, wherein the liquid distributor comprises a mixing chamber configured to hold a high liquid head.

17. A sea going vessel comprising:
a separation tower comprising at least two packed beds;
a vapor redistribution plate disposed between two sequentially disposed packed beds, wherein the vapor redistribution plate is configured to mix a vapor from a lower packed bed before introducing the vapor into an upper packed bed; and
a divider plate within a packed bed, wherein the divider plate is disposed along the axis of the packed bed, and wherein the divider plate is configured to prevent liquid flow from one area of the packed bed to another area of the packed bed, and wherein the divider plate comprises a panel with a surface feature configured to inhibit liquid from flowing along the panel, wherein the surface feature comprises an undulation.

18. The sea going vessel of claim 17, comprising storage facilities for hydrocarbons.

19. A sea going vessel comprising:
a separation tower comprising at least two packed beds;
a vapor redistribution plate disposed between two sequentially disposed packed beds, wherein the vapor redistribution plate is configured to mix a vapor from a lower packed bed before introducing the vapor into an upper packed bed; and
a divider plate within a packed bed, wherein the divider plate is disposed along the axis of the packed bed, and wherein the divider plate is configured to prevent liquid flow from one area of the packed bed to another area of the packed bed, and wherein the divider plate comprises a panel with a surface feature configured to inhibit liquid from flowing along the panel, wherein the surface feature comprises a tab that projects from the panel.

* * * * *